(12) United States Patent
Fyfe

(10) Patent No.: US 11,198,551 B2
(45) Date of Patent: Dec. 14, 2021

(54) SHAMPOO BOTTLE WITH REPLACEABLE COLOR CARTRIDGES

(71) Applicant: L'Oreal, Paris (FR)

(72) Inventor: Jason Fyfe, Homdel, NJ (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 16/728,501

(22) Filed: Dec. 27, 2019

(65) Prior Publication Data
US 2021/0198027 A1 Jul. 1, 2021

(51) Int. Cl.
*B65D 81/32* (2006.01)
*A45D 34/00* (2006.01)
*B05B 7/04* (2006.01)

(52) U.S. Cl.
CPC ......... *B65D 81/3227* (2013.01); *A45D 34/00* (2013.01); *B05B 7/0408* (2013.01); *A45D 2034/005* (2013.01); *A45D 2200/058* (2013.01)

(58) Field of Classification Search
CPC ...... B65D 1/32; B65D 1/323; B65D 81/3227; B65D 81/3222; B65D 81/3233; B65D 81/3238; B65D 81/3244; B65D 35/22; B65D 35/242; B65D 83/0094; A45D 34/00; A45D 2034/005; A45D 2200/058; B67D 7/0216; B67D 7/0222; B67D 7/0255; B67D 7/007; B05B 7/0408
See application file for complete search history.

(56) References Cited

U.S. PATENT DOCUMENTS

| | | | | | |
|---|---|---|---|---|---|
| 2,873,887 | A | * | 2/1959 | Spero | B65D 35/242 222/94 |
| 3,217,931 | A | * | 11/1965 | Farrar | B65D 81/3227 222/94 |
| 3,635,375 | A | * | 1/1972 | Gaetke | B05B 11/046 222/94 |
| 3,731,844 | A | * | 5/1973 | Baker | B65D 51/20 222/83 |
| 3,850,346 | A | * | 11/1974 | Richardson | B65D 81/3227 222/145.7 |
| 3,904,087 | A | * | 9/1975 | McRoskey | B05B 11/041 222/632 |
| 3,966,089 | A | * | 6/1976 | Klingaman | B05B 11/0078 222/88 |
| 4,190,180 | A | * | 2/1980 | Bennet | A45D 34/00 222/207 |
| 4,201,316 | A | * | 5/1980 | Klingaman | B05B 11/0078 222/136 |

(Continued)

FOREIGN PATENT DOCUMENTS

JP 3152288 U 7/2009
WO 2017204381 A1 11/2015

*Primary Examiner* — Patrick M. Buechner
(74) *Attorney, Agent, or Firm* — Christensen O'Connor Johnson Kindness PLLC

(57) ABSTRACT

A dual chamber bottle includes a doser for mixing and dispensing two liquids. The bottle holds a first bulk liquid in a bulk chamber. The bottle holds a second additive liquid in a cartridge. The first and second liquid are segregated from each other. The doser is provided to dose the additive liquid into the bulk liquid. The second liquid is an additive that enhances a quality of the first liquid. The bulk chamber can be squeezed to dispense the bulk liquid out of the bottle while introducing the additive liquid to the bulk liquid in the process of dispensing.

10 Claims, 6 Drawing Sheets

(56) References Cited

U.S. PATENT DOCUMENTS

| | | | | |
|---|---|---|---|---|
| 4,531,659 | A | * | 7/1985 | Wright .................. A45D 27/10 222/190 |
| 4,585,149 | A | * | 4/1986 | Zulauf ............... B65D 81/3244 222/144.5 |
| 4,585,150 | A | * | 4/1986 | Beacham ........... B65D 81/3216 222/129 |
| 6,209,757 | B1 | * | 4/2001 | Dumont ............. B65D 51/2807 222/145.5 |
| 8,302,803 | B1 | | 11/2012 | Greenberg et al. |
| 8,590,753 | B2 | | 11/2013 | Marina et al. |
| 2007/0045342 | A1 | * | 3/2007 | Pigliacampo ........ B65D 47/283 222/129 |
| 2009/0134110 | A1 | * | 5/2009 | Jones ................ B65D 81/3227 215/6 |
| 2011/0127296 | A1 | * | 6/2011 | Hayet .................. B65D 35/242 222/94 |
| 2011/0290824 | A1 | * | 12/2011 | Smith ................ B65D 51/2864 222/135 |
| 2014/0020706 | A1 | * | 1/2014 | Thiebaut ................ A45D 34/06 132/314 |
| 2015/0291312 | A1 | * | 10/2015 | Kalagher ............... B65D 25/04 215/6 |
| 2015/0306615 | A1 | * | 10/2015 | Duncan .............. B05B 11/0037 222/135 |
| 2015/0336722 | A1 | * | 11/2015 | Brook-Chrispin ........................... B65D 51/2807 215/228 |
| 2019/0119028 | A1 | * | 4/2019 | Son ....................... A61J 1/2093 |
| 2020/0361679 | A1 | * | 11/2020 | Le Reverend ..... A47G 19/2266 |

* cited by examiner

SHAMPOO BOTTLE WITH REPLACEABLE COLOR CARTRIDGES

SUMMARY

In one embodiment, a bottle comprises: a squeezable main chamber configured to dispense a bulk liquid; a cap that dispenses the bulk liquid; and a bulkhead between the main chamber and cap, wherein the bulkhead supports a cartridge containing an additive liquid that is dosed into the bulk liquid.

In one embodiment, the bulk liquid is a hair care product, and the additive liquid includes a dye or coloring agent.

In one embodiment, the additive liquid is dosed as the bottle is squeezed to dispense the bulk liquid.

In one embodiment, the additive liquid is dosed prior to dispensing the bulk liquid.

In one embodiment, squeezing the main chamber doses the additive liquid and dispenses the bulk liquid.

In one embodiment, the cartridge is pliant to deform when the squeeze bottle is squeezed.

In one embodiment, the cartridge is sealed.

In one embodiment, a combination of hair care products comprises: a bottle with a squeezable main chamber configured to dispense a bulk liquid; a cap that dispenses the bulk liquid; and a bulkhead between the main chamber and cap, wherein the bulkhead supports a cartridge containing an additive liquid that is dosed into the bulk liquid; and one or more cartridges containing additive liquids.

In one embodiment, a method of infusing a hair care product with an additive liquid, comprises: providing a squeeze bottle with a main chamber containing a bulk liquid and a cartridge containing an additive liquid; and squeezing the squeeze bottle to dispense both the additive liquid and bulk liquid from the bottle.

In one embodiment, the method further comprises dosing the additive liquid into the bulk liquid when squeezing the squeeze bottle.

In one embodiment, the method further comprises replacing the cartridge with a different cartridge having a different additive liquid.

In one embodiment, the method comprises dosing the additive liquid into a dosing chamber before dispensing the bulk liquid from the squeeze bottle.

In one embodiment, the bulk liquid passes into the dosing chamber before being dispensed.

In one embodiment, the additive liquid is a dye or coloring agent.

In one embodiment, a method of making a squeeze bottle, comprises: inserting a cartridge containing an additive liquid into a compartment of a squeeze bottle, wherein the compartment is segregated from a bulk liquid in a squeezable bulk chamber.

In one embodiment, the compartment of the additive liquid is supported from a bulkhead separating the squeezable bulk chamber from a dispensing cap.

In one embodiment, the cap comprises a additive liquid doser for dosing additive liquid into the bulk liquid.

In one embodiment, a bottle, comprises: a squeezable main chamber configured to dispense a bulk liquid; a cap that dispenses the bulk liquid; and a dissolvable cartridge in contact with the bulk liquid.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

This disclosure relates to a dual chamber bottle with a doser for mixing and dispensing at least two liquids. The bottle holds a first bulk liquid in a bulk chamber, and the bottle holds a second additive liquid in a cartridge. The first and second liquid are segregated from each other. The doser is provided to dose the additive liquid into the bulk liquid. The second liquid is an additive that enhances a quality of the first liquid.

In one embodiment, the bottle and mixing dispenser according to this disclosure has uses for dispensing personal care products to a user. In one embodiment, the first liquid is a shampoo or other hair care product, and the second liquid is a colorant or dye to enhance the color of the shampoo.

In one embodiment, the second additive liquid is only mixed with the first bulk liquid immediately prior to or at the time of dispensing the first bulk liquid or both prior to and at the time of dispensing the first bulk liquid.

In one embodiment, a doser doses the second additive liquid into the bulk liquid. The second additive liquid is provided in a replaceable cartridge that fits into a respective magazine.

Figure 1:
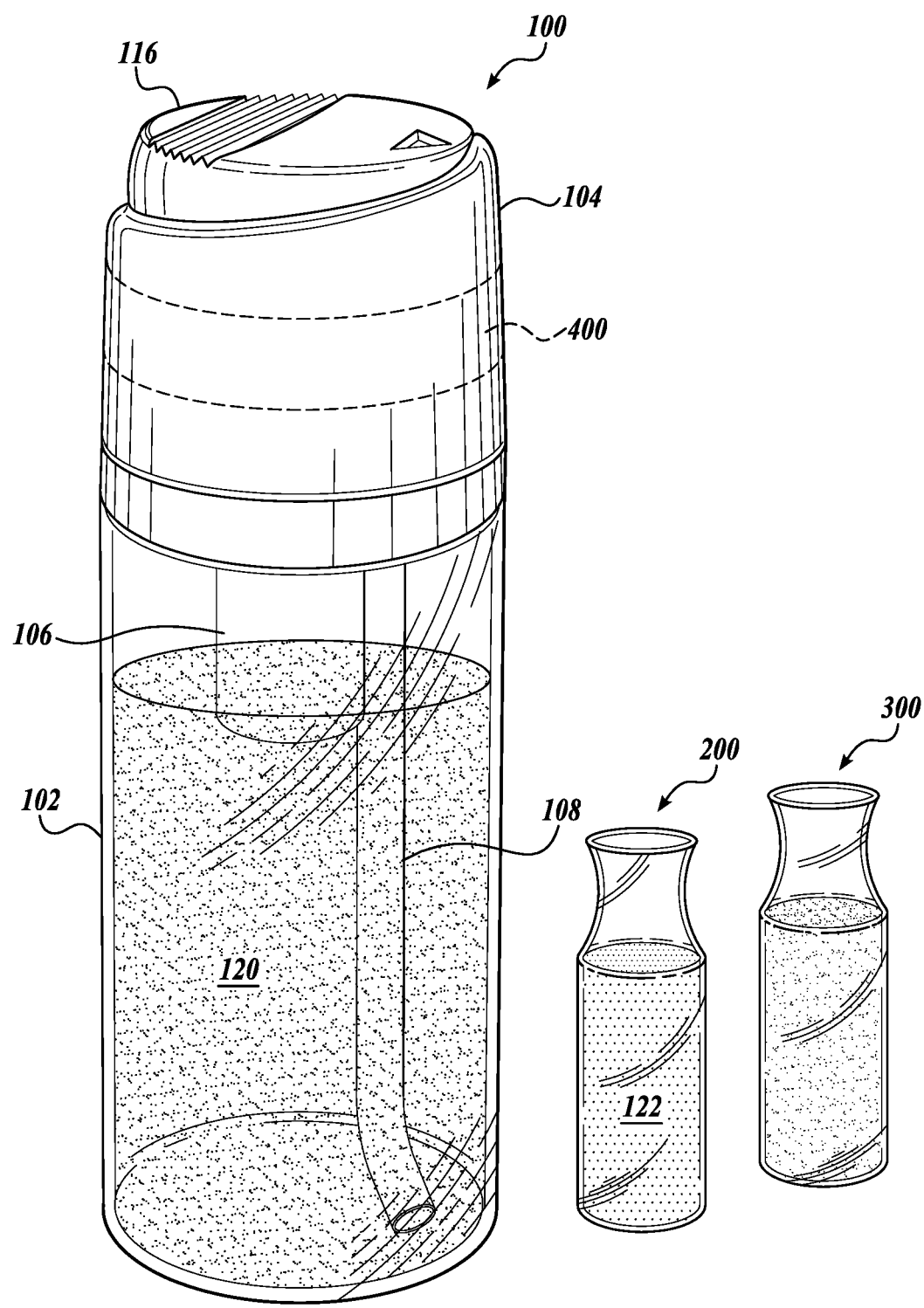
FIG. 1 is a diagrammatical illustration of a bottle and replaceable cartridges in accordance with an embodiment of this disclosure.
Figure 2:
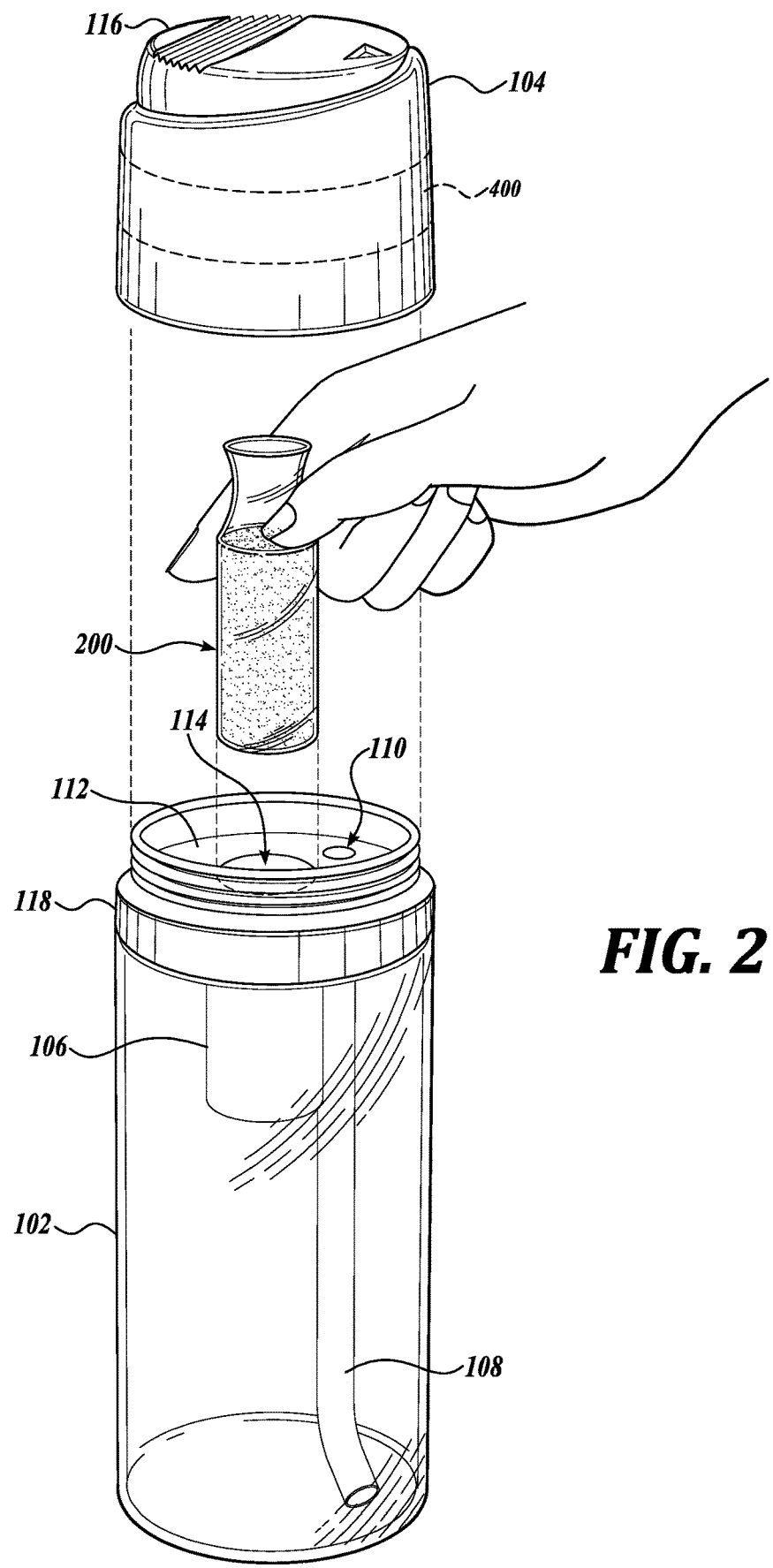
FIG. 2 is a diagrammatical illustration of the bottle of FIG. 1 illustrating the insertion of a replaceable cartridge.

Referring to FIGS. 1 and 2 a bottle 100 according to one embodiment will be described. The bottle 100 includes a plastic, optionally transparent or translucent, bulk chamber 102. The bulk chamber 102 can be any plastic that is readily pliant by application of manual pressure allowing the liquid therein to be dispensed from the bottle 100 through the diptube 108 by squeezing. In one embodiment, the bulk chamber 102 is pliant to bend or yield reversibly, however, the material is not destroyed or altered in an irreversible manner. The bottle 100 includes a rigid or semi-rigid plastic, optionally opaque, cap 104 for housing the additive liquid doser 400.

In an embodiment, the bulk chamber 102 can have any geometric form including regular or irregular forms. In an embodiment, the bulk chamber 102 comprises a cross-section of substantially any geometric shape including circular, triangular, square, rectangular polygonal, regular or irregular shapes, or the like, as well as other symmetrical and asymmetrical shapes, or combinations thereof. In an embodiment, the bulk chamber 102 includes a body structure that is substantially cylindrical. In an embodiment, the bulk chamber 102 includes a body structure that is substantially rigid or semi-rigid. In an embodiment, the bulk chamber 102 includes a body structure that is pliable or semi-pliable. The bulk chamber 102 can be constructed out of a variety of materials including, for example, elastomers, co-elastomers, polymers, co-polymers, and blends or combinations thereof, etc. Other suitable materials for fabrication bulk chamber 104 include thermoplastic polymers, thermoplastic elastomers, glass, metals, and the like.

In an embodiment, the bulk chamber 102 are made from one or more recyclable materials, compostable materials, sustainable materials, biodegradable materials, plant-based material, and the like. In an embodiment, the bulk chamber 102 comprises one or more of biodegradable polymers, biodegradable polyesters, biodegradable polyurethanes, biodegradable starches, biodegradable cellulosic materials, biodegradable aliphatic polyesters, and the like.

In an embodiment, the bulk chamber 102 is made from one or more recyclable materials, compostable materials, sustainable materials, biodegradable materials, plant-based material, and the like. In an embodiment, the bulk chamber 102 comprises one or more of biodegradable polymers, biodegradable polyesters, biodegradable polyurethanes, biodegradable starches, biodegradable cellulosic materials, biodegradable aliphatic polyesters, and the like.

In an embodiment, the bulk chamber 102 is made from injection molded starch. In an embodiment, the bulk chamber 102 is made from bamboo or wood pulp or bagasse using thermoforming or injection molding processes. In an embodiment, the bulk chamber 102 includes mycelium & agricultural waste (as binder). In an embodiment, the bulk chamber 102 is made bio-based thin films. In an embodiment, the bulk chamber 102 is made from compostable or biodegradable materials, such as poly(lactic acid), polyethylene terephthalate, polycaprolactone, poly(1,4-butylene succinate), polyhydroxyalkanoate, cellulose and its derivatives, and polybutylene adipate terephthalate. In an embodiment, the bulk chamber 102 is made from non-woven poly(vinyl alcohol), optionally, impregnated with active ingredients. In an embodiment, the bulk chamber 102 includes methylated crystalline cellulose (MCC) as a formula delivery vehicle.

In an embodiment, other parts of the bottle 100, including the cap 104, spout 116, bulkhead 118, and cartridges 200, 300 can be made from the above-mentioned materials.

Figure 3:
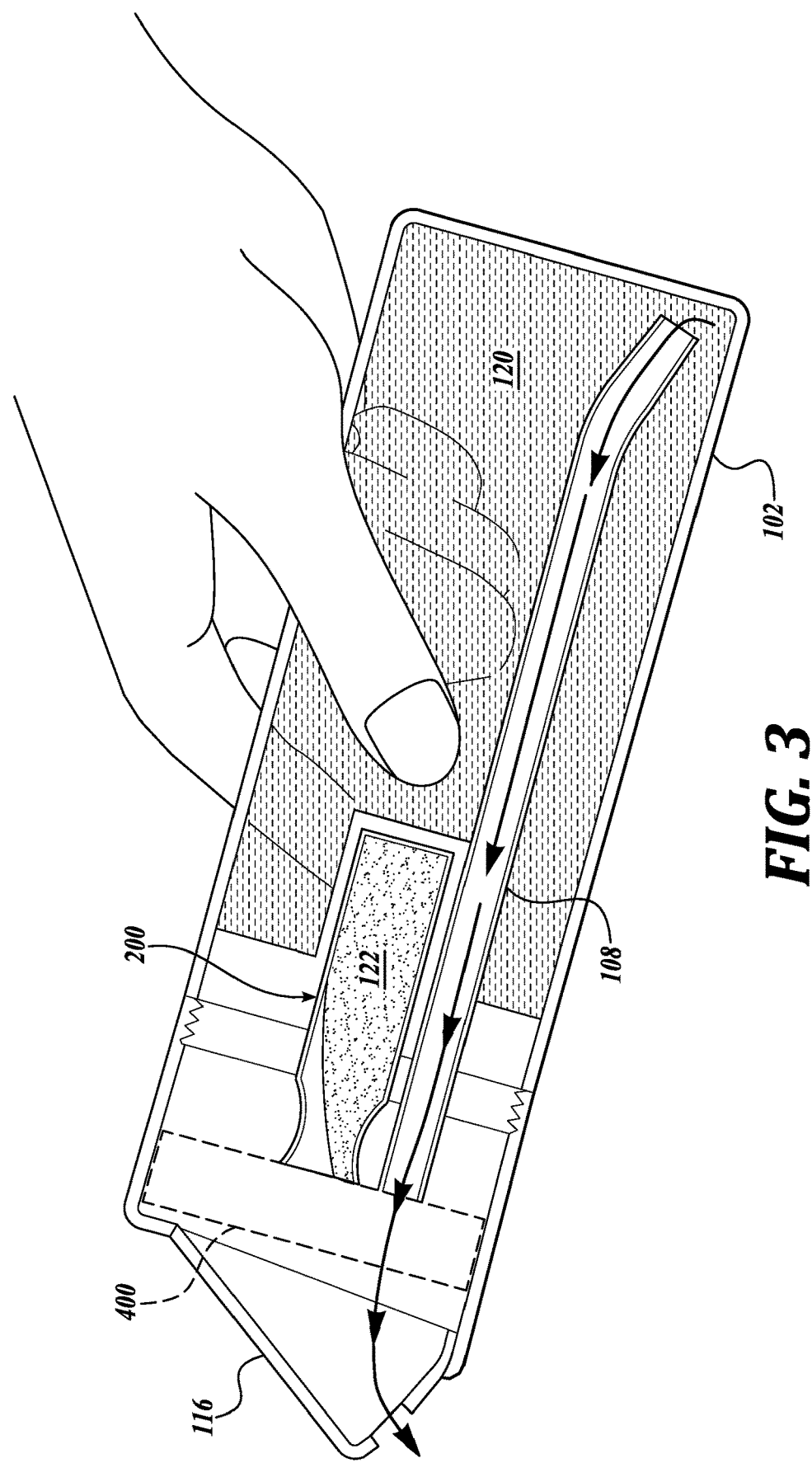
FIG. 3 is a diagrammatical illustration of the bottle of FIG. 1 illustrating the mixing and dispensing of the fluids.

In one embodiment, the cap 104 includes a levered spout 116 that pivots to open and close a passageway for dispensing the liquids. For example, in the position illustrated in FIGS. 1 and 2, the levered spout 116 is down closing the passageway, while in FIG. 3 the levered spout 116 is up opening the passageway and allowing dispensing of the liquid mixture. In one embodiment, the levered spout 116 pivots between the open and closed position by pivoting at a fulcrum, so that opening and closing the passageway depends on depressing the levered spout 116 at one or the other side of the fulcrum.

Referring to FIG. 2, in one embodiment, a bulkhead 118 connects the bulk chamber 102 to the cap 104. The bulkhead 118 can be made from rigid or semi-rigid plastic. In one embodiment, the bulkhead 118 can thread on to the top end of the bulk chamber 102. In one embodiment, the bulk chamber 102 has outer threads on the upper end of the chamber 102, and the bulkhead 118 can have matching inner threads on the lower side that thread on to the lower chamber 102. Further, the bulkhead 118 can have outer threads on the upper side that allow the cap 104 with inner matching threads to thread on to the upper side of the bulkhead 118.

In one embodiment, the bulkhead 118 also prevents the liquid in the bulk chamber 102 from mixing prematurely with the additive liquid 122. The bulkhead 118 includes a flat disk 112 that seals the bulk chamber 102 on top except for a small opening 110 to which a diptube 108 is attached. The diptube 108 extends down from the opening 110 to the bottom of the bulk chamber 102.

In one embodiment, the bulkhead 118 also includes a magazine 106. In one embodiment, the magazine 106 is a cylindrical tube with an opening 114 level with the disk 112, and the magazine 106 extends down into the bulk chamber 102, but is closed on the bottom. The magazine 106 is a compartment to hold the replaceable cartridges 200, 300 with the additive liquid 122. The magazine 106 may have an inner diameter that matches with the outer diameter of the cartridges 200, 300 so as to prevent the cartridge 200, 300 from falling out when the container bottle 100 is tipped upside down.

The cartridges 200, 300 hold the additive liquid 122 that is mixed with the bulk liquid 120 upon dispensing the bulk liquid 120 so as to give the dispensed bulk liquid a desired characteristic. Cartridges 200, 300 are generally cylindrical closed-bottom vessels. The cartridges 200, 300 are replaceable and interchangeable to give the consumer a variety of choices. The cartridges 200, 300 can be made from materials similar to the bulk chamber 102.

In one embodiment, cartridges 200, 300 have dissolvable shells, and the dissolvable cartridges 200, 300 can be inserted in direct contact with the bulk liquid 120 in the bulk chamber 102, which causes the dissolvable shells to dissolve, and dispensing the additive liquid 122 into the bulk liquid 120. In one embodiment, a dissolvable shell is made from poly(vinyl alcohol) or its derivatives and copolymers. In the dissolvable cartridge embodiments, the bottle 100 may not have a bulkhead 118 or doser 400. In dissolvable cartridge embodiments, the entire contents of the cartridge 200, 300 are mixed with the entire contents of the bulk chamber 102.

In embodiments with replaceable, non-dissolvable cartridges, the top opening of the cartridges 200, 300 can be sealed in various ways to prevent leakage prior to use. In one embodiment, cartridges 200, 300 are sealed by a puncture seal, i.e., a seal designed to be readily punctured which self-seals around the puncture, such as a rubber film. In another embodiment, a reusable rubber stopper is fitted to the top of the cartridges 200, 300 to provide a seal to prevent the additive liquid 122 from leaking.

Referring to FIG. 2, the bottle 100 can be a reusable and refillable bottle 100 upon using up all the bulk liquid 120 or the additive liquid 122. In one embodiment, the bulkhead 118 can be separated from the bulk chamber 102 to initially fill or to re-fill the bulk chamber 102 with a hair care product, for example. Then, the bulkhead 118 is reattached to the bulk chamber 102. A cartridge 200 or 300 is selected and placed in the opening 114 into the magazine 106.

Next, the cap 104 is reattached to the bulkhead 118, and in the process the cartridge 200 is sealed to the additive liquid doser 400 housed in the cap 104.

In one embodiment, the additive liquid doser 400 is for dosing the additive liquid 122 from the cartridge 200. In one embodiment, the additive liquid doser 400 is for dosing a small amount of additive liquid 122 into the bulk liquid 120 that is being dosed. The additive liquid 122 can be dosed in pre-determined quantities or in a varying quantity. The additive liquid doser 400 therefore is configure for dosing an amount of additive liquid 122 less than the entire amount in the cartridge 200, 300. Dosing can be a continuous infusion of the additive liquid 122 in the stream of bulk liquid 120 with or without turbulent stream mixing. Dosing can be a single dose of additive liquid 122 delivered to a mixing chamber of predetermined volume, following by mixing with the stream of bulk liquid 120. In order to withdraw the additive liquid 122 from the cartridge 200, dose the additive liquid, and infuse the additive liquid 122 into the bulk liquid 120 several techniques can be employed.

Figure 4B:
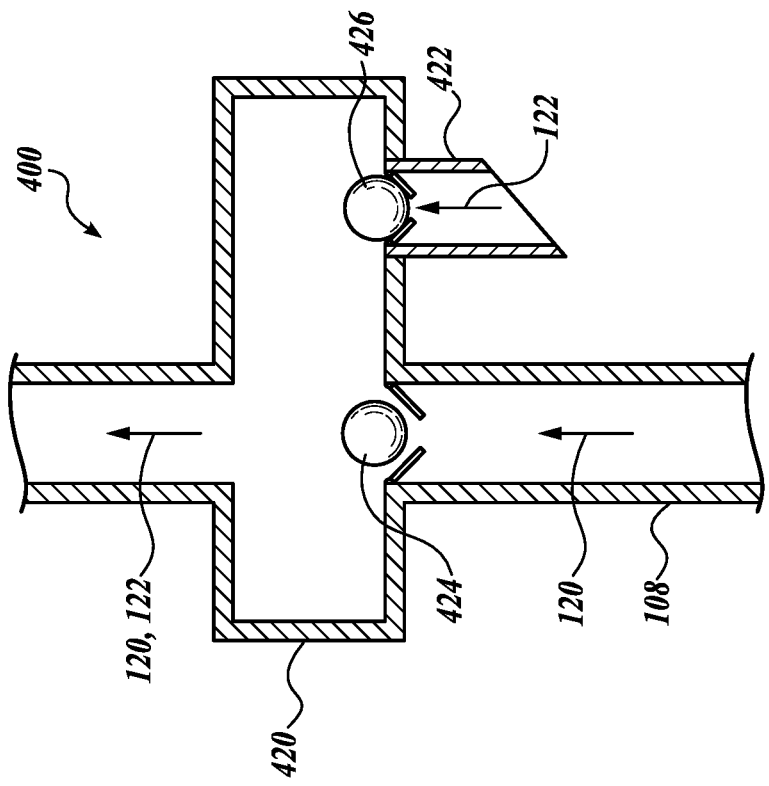
FIG. 4B is a diagrammatical illustration of an additive liquid doser in accordance with one embodiment.
Figure 4A:
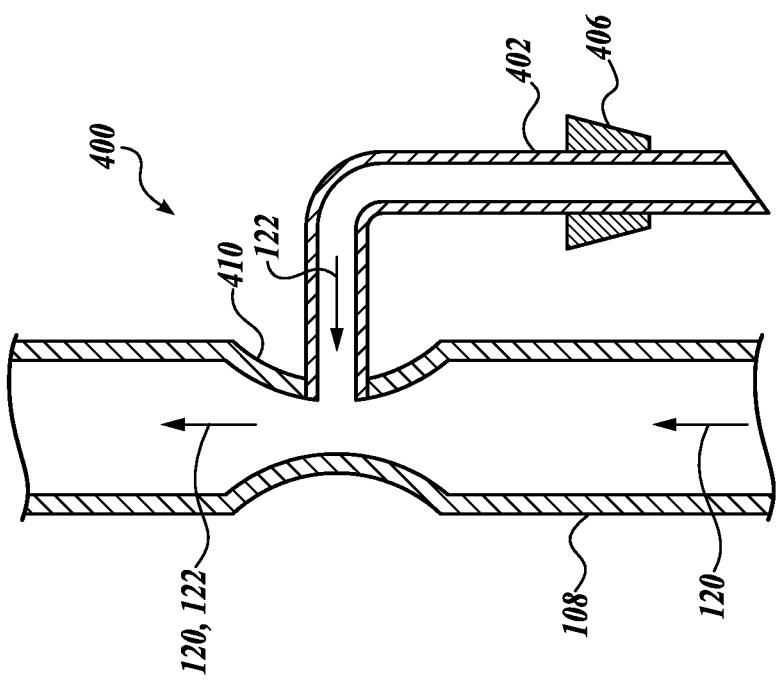
FIG. 4A is a diagrammatical illustration of an additive liquid doser in accordance with one embodiment.

Referring to FIG. 4A, in one embodiment, the additive liquid doser 400 includes a mixer 410, such as a venturi mixer. In this embodiment, squeezing the bulk chamber 102 forces the bulk liquid 120 into and up through the diptube 108, whereafter the liquid 120 passes through the throat of the venturi 410 thereby drawing the additive liquid 122 by the venturi effect, thereby also mixing the additive liquid 122 in the stream of bulk liquid 120. In FIG. 4A, a diptube 402 with a rubber stopper 406 for sealing the opening in the cartridge 200 is illustrated. A similar diptube and rubber stopper can be applied to all embodiments of the additive liquid doser 400.

Referring to FIG. 4B, in one embodiment, the additive liquid doser 400 includes a dosing chamber 420 having a predetermined volume. In this embodiment, a first one-way valve 426 is provided at the top end of the diptube 422 for the additive liquid 122. A second one-way valve 424 is provided at the top end of the diptube 108 for the bulk liquid 120. First and second one-way valves 426, 424 prevent liquids the return of liquids from the dosing chamber 420 to the respective cartridge 200 and bulk chamber 102. In this embodiment, to dose the additive liquid 122 in the dosing chamber 420 first, the bottom 100 is inverted to let the additive liquid 122 drain by gravity into the chamber 420. Then, the bottle 100 is inverted again to end the dosing. The consumer may then squeeze the bulk chamber 102 to force the bulk liquid 120 into the dosing chamber 420 where it may mix with the additive liquid 122 before being expelled out from the dosing chamber 420 to the spout 116. In another embodiment, the bottle 100 does not need to be inverted to dose the additive liquid 122 to the dosing chamber 420. Instead, the magazine 106 and cartridge are made from a more pliable plastic than the bulk chamber 102. Therefore, upon squeezing the bulk chamber 102, the pressure is relieved by deforming the magazine 106 and cartridge 200 first, followed by forcing the bulk liquid 120 up through the diptube 108. In one embodiment, the main chamber 102 is squeezed to fill the dosing chamber 402 with the bulk liquid. Then, the bottle 100 can be inverted to allow a predetermined amount of additive liquid 122 into the dosing chamber 402. Shaking the bottle 100 can mix the additive liquid 122 and the bulk liquid 120 to add color. Then, the levered spout 116 can be opened, and the combined mixture can be poured out through the spout 116.

In one embodiment, the dosing chamber 420 and valves 424, 426 can be omitted. In this embodiment, the diptubes 422, 418 for the additive liquid 122 and bulk liquid 120, respectively, are connected directly to the outlet in the spout 116. Therefore, upon squeezing the bulk chamber 102, the dispensing of the additive liquid 122 precedes, the dispensing of the bulk liquid 120. Thus, there is little to no mixing prior to dispensing, and the customer may simply mix the liquids in the hand, or upon applying the liquids on the hair to work up to a lather.

Figure 4C:
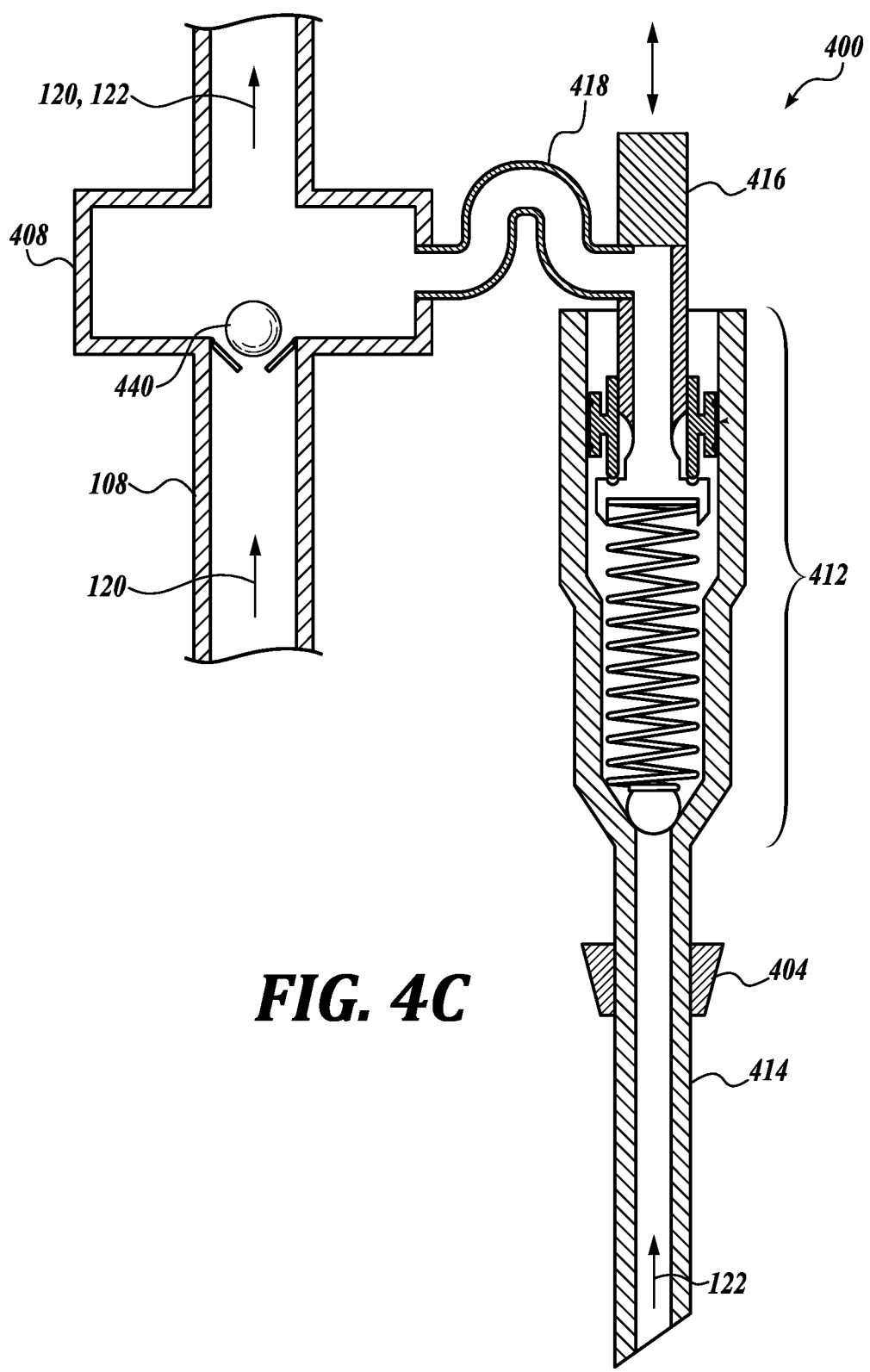
FIG. 4C is a diagrammatical illustration of an additive liquid doser in accordance with one embodiment.

Referring to FIG. 4C, in one embodiment, the additive liquid doser 400 includes a pump assembly 412 to dose the additive liquid 122 into a dosing chamber 408. For example, the pump assembly 412 includes a piston 416 which can be directly linked to the levered spout 116, so that when the levered spout 116 is pushed down to open the dispensing passageway, a dose of the additive liquid 122 is delivered into the dosing chamber 408. A one-way valve 440 prevents the additive liquid 122 from flowing into the diptube 108 of the bulk liquid 120. In the pump assembly 412, the additive liquid 122 flows through the hollow center of the piston 416 and then into a flexible tube 418 leading to the dosing chamber 408. The dosing of the additive liquid 122 becomes semi-automatic, because the levered spout 116 needs to be pressed down in order to dispense the bulk liquid 120. Thereafter, the consumer may then squeeze the bulk chamber 102 to force the bulk liquid 120 into the dosing chamber 408 where it may mix with the additive liquid 122 before being expelled out from the dosing chamber 420 to the spout 116.

Figure 4D:
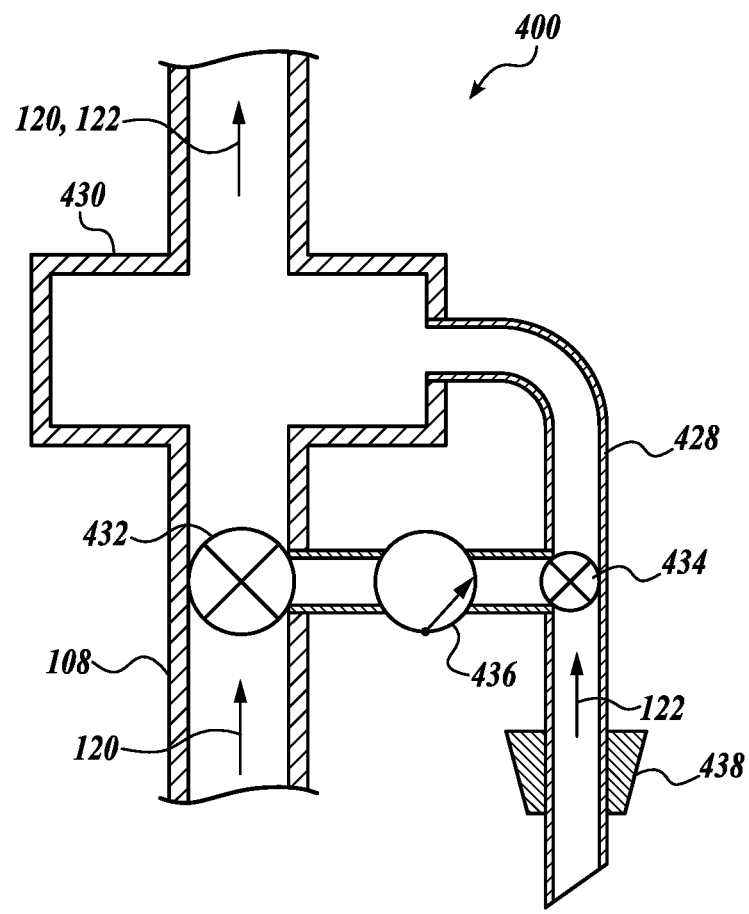
FIG. 4D is a diagrammatical illustration of an additive liquid doser in accordance with one embodiment.

Referring to FIG. 4D, this embodiment of the additive liquid doser 400 is similar to the embodiment of FIG. 4B, however, where one-way valves are used in FIG. 4B, in FIG. 4D, a type of plug valve is used that requires manual assisted to open and close. The valve 434 on the diptube 428 of the additive liquid 122 and the valve 432 on the diptube 108 of the bulk liquid are linked so that as one valve is opened the other valve is closed. An indicator 436 can show which valve is presently open. In this embodiment, the consumer may open the valve 434, closing the valve 432, first to dose the additive liquid 122 into the dosing chamber 430 by squeezing the bulk chamber 102. Then, open the valve 432, closing the valve 434, to dispense the bulk liquid 120 to the dosing chamber 430 and then out of the spout 116 by further squeezing of the bulk chamber 102.

One embodiment of this disclosure relates to a dual chamber bottle with a doser for mixing and dispensing at least two liquids. The bottle holds a first bulk liquid in a bulk chamber, and the bottle holds a second additive liquid in a cartridge. The first and second liquid are segregated from each other. The doser is provided to dose the additive liquid into the bulk liquid. The second liquid is an additive that enhances a quality of the first liquid.

While illustrative embodiments have been illustrated and described, it will be appreciated that various changes can be made therein without departing from the spirit and scope of the invention.

The invention claimed is:

1. A bottle, comprising:
   a squeezable bulk chamber configured to dispense a bulk liquid;
   a cap that dispenses the bulk liquid; and
   a bulkhead between the bulk chamber and cap, wherein the bulkhead supports a cartridge containing an additive liquid that is dosed into the bulk liquid, the bulkhead includes a magazine that extends below the bulkhead into the bulk chamber, wherein the cartridge fits into the magazine, wherein the bulkhead and cap are separably removable from the bulk chamber, wherein the bulkhead is removable to fill the bulk chamber with the bulk liquid, and the cap is removable while the bulkhead is attached on the bulk chamber to remove and replace the cartridge from the magazine.

2. The bottle of claim 1, wherein the bulk liquid is a hair care product, and the additive liquid includes a dye or coloring agent.

3. The bottle of claim 1, wherein the additive liquid is dosed as the bottle is squeezed to dispense the bulk liquid.

4. The bottle of claim 1, wherein the additive liquid is dosed prior to dispensing the bulk liquid.

5. The bottle of claim 1, wherein squeezing the bulk chamber doses the additive liquid and dispenses the bulk liquid.

6. The bottle of claim 1, wherein the cartridge is pliant to deform when the squeeze bottle is squeezed.

7. The bottle of claim 1, wherein the cartridge is sealed.

8. A combination of hair care products, comprising:
the bottle of claim 1, and
one or more cartridges containing additive liquids.

9. A bottle, comprising:
a squeezable bulk chamber configured to dispense a bulk liquid;
a cap that dispenses the bulk liquid;
a bulkhead between the bulk chamber and cap, wherein the bulkhead supports a cartridge containing an additive liquid that is dosed into the bulk liquid;
a first diptube extending into the bulk chamber;
a second diptube extending into the cartridge; and
a mixer connected to the first and second diptubes, wherein squeezing the bulk chamber forces the bulk liquid into the first diptube and past the mixer, thereby drawing the additive liquid into the mixer to mix with the bulk liquid, the bulkhead includes a magazine that extends below the bulkhead into the bulk chamber, wherein the cartridge fits into the magazine, wherein the bulkhead and cap are separably removable from the bulk chamber, wherein the bulkhead is removable to fill the bulk chamber with the bulk liquid, and the cap is removable while the bulkhead is attached on the bulk chamber to remove and replace the cartridge from the magazine.

10. A bottle, comprising:
a squeezable bulk chamber configured to dispense a bulk liquid;
a cap that dispenses the bulk liquid;
a bulkhead between the bulk chamber and cap, wherein the bulkhead supports a cartridge containing an additive liquid that is dosed into the bulk liquid; and
a venturi mixer connected to the bulk chamber and cartridge, wherein squeezing the bulk chamber forces the bulk liquid past a throat of the venturi mixer, thereby drawing the additive liquid into the venturi mixer to mix with the bulk liquid, the bulkhead includes a magazine that extends below the bulkhead into the bulk chamber, wherein the cartridge fits into the magazine, wherein the bulkhead and cap are separably removable from the bulk chamber, wherein the bulkhead is removable to fill the bulk chamber with the bulk liquid, and the cap is removable while the bulkhead is attached on the bulk chamber to remove and replace the cartridge from the magazine.

\* \* \* \* \*